Feb. 27, 1951     H. W. FAUS     2,543,161
ROLLER BEARING HOT BOX ALARM
Filed Aug. 3, 1948     2 Sheets-Sheet 1
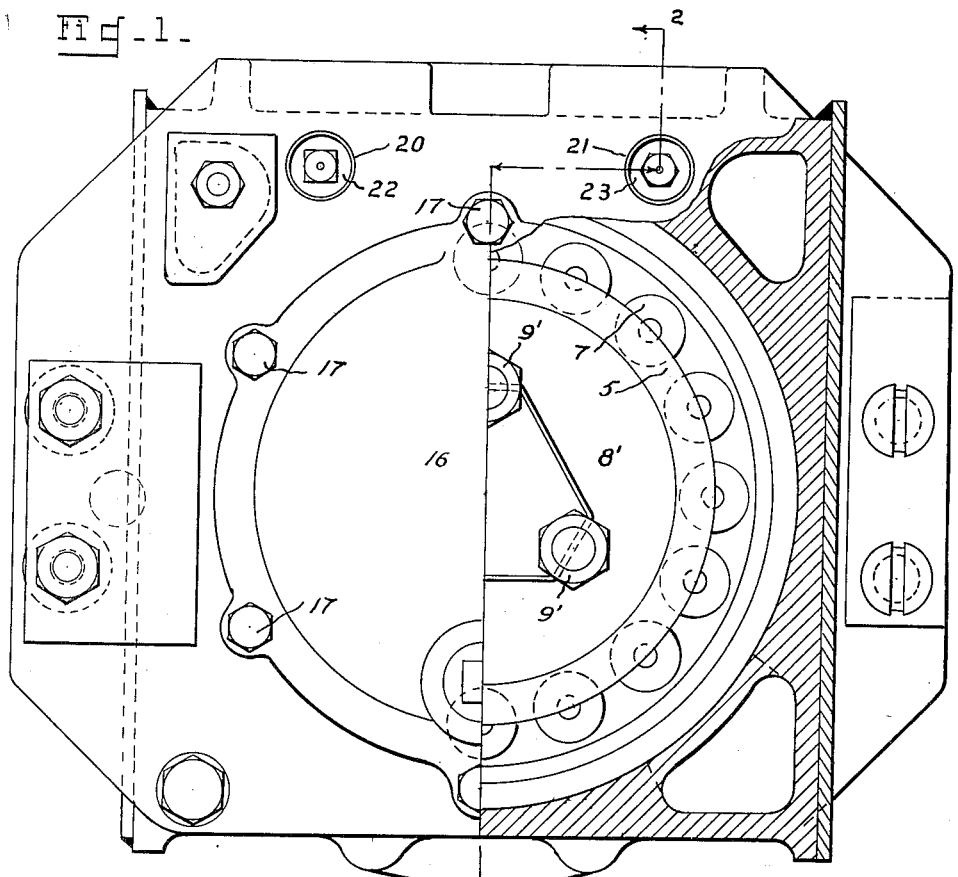
INVENTOR:
Herbert W. Faus,
BY
A. C. Hines,
ATTORNEY.

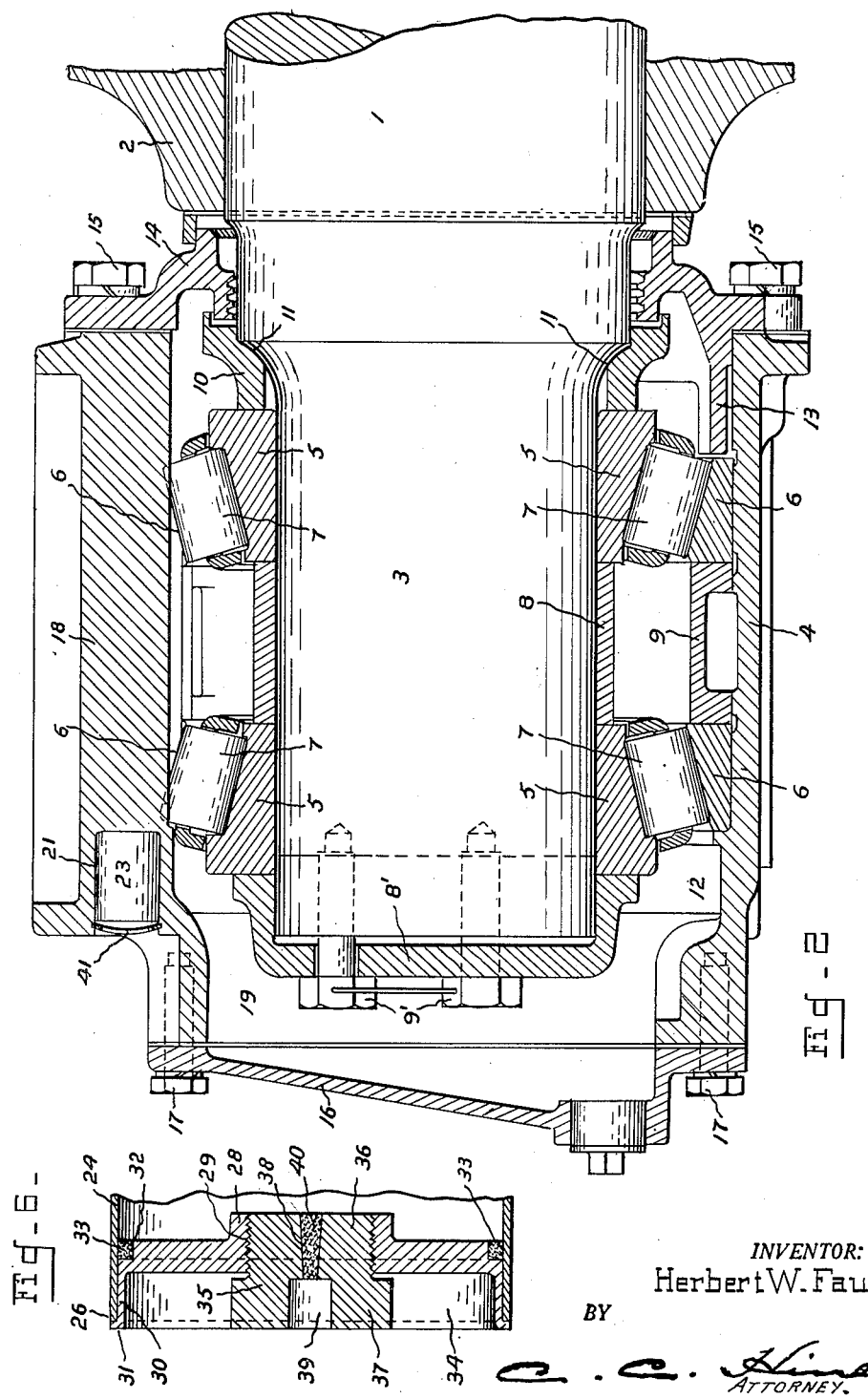

Patented Feb. 27, 1951

2,543,161

UNITED STATES PATENT OFFICE 2,543,161

ROLLER BEARING HOTBOX ALARM

Herbert W. Faus, White Plains, N. Y.

Application August 3, 1948, Serial No. 42,207

7 Claims. (Cl. 116—114.5)

1

This invention relates to an alarm or signal device of cartridge type for indicating the overheating of a bearing, and particularly to an alarm device for use in axle boxes equipped with roller bearings. The invention has for its main object to provide a simple, reliable and efficient construction of thermic cartridge that will indicate by sense of sight or smell, or both, the overheating of a roller bearing.

Another object is to provide a cartridge which is proof against loosening of its seal and leakage, or discharge of the signal material, until the necessity for the giving of a signal arises.

Still another object is to provide a construction insuring a controlled discharge of a vaporized signal material for a sufficient period of time to give an effective signal. Other objects are to provide a construction of cartridge which may be easily and economically made, charged and sealed, and a construction of bearing box permitting of the ready application of a charged cartridge and removal of a spent cartridge, protection of the cartridge from injury when in service and the free and unobstructed discharge of the vapor beyond the box in a signaling operation. The invention consists in the novel construction of the cartridge and manner of mounting the same in the bearing box for cooperation with the bearing means therein.

In the accompanying drawing illustrating the invention,

Fig. 1 is a sectional front elevation of a bearing box of the type described provided with a pair of alarm devices embodying my invention.

Fig. 2 is a vertical longitudinal section of the same taken substantially on line 2—2 of Fig. 1.

Fig. 3 is a vertical longitudinal section through one of the cartridges on an enlarged scale.

Fig. 4 is a front end elevation of a cartridge designed to give a smoke signal.

Fig. 5 is a similar view of a cartridge designed to give an odoriferous signal.

Fig. 6 is a vertical longitudinal section through the discharge end of the cartridge on a larger scale than that shown in Fig. 3.

Referring now more particularly to the drawings, showing my invention in connection with a roller bearing axle, I designates the axle having a wheel 2 mounted thereon and provided with a journal portion 3 extending into a journal box or housing 4 in which are arranged two axially spaced tapered roller bearings.

Each tapered roller bearing comprises a cone or inner raceway member 5, mounted on the axle journal, a cone cup or outer raceway member 6

2 seated in the journal box, and a series of conical bearing rollers 7 disposed between the cone and cup.

Sleeves 8 and 9, arranged, respectively, about the journal and within the bearing box, engage the relatively inner surfaces of the sets of cones 5 and 6 and hold them properly spaced and from inward movement. A retaining cap 8', fitted on the outer end of the journal and secured thereto by cap screws 9', engages the outer surface of the front cone 5 and holds it from outward displacement, while an oil retaining sleeve 10, fitting against the shoulder 11 of the journal, engages the outer surface of the rear cone 5 and holds it from outward displacement. The relatively outer surfaces of the front and rear cones 6 engage flanges 12 and 13 formed, respectively, on the bearing box and a closure member 14 for the inner end of the journal box, whereby these cones are held from outward displacement. The closure member 14 comprises an annular plate removably secured by cap screws 15 to the bearing box. It may be provided or associated with suitable means coacting therewith and with the ring 10 to prevent leakage of oil from and entrance of dust to the inner end of the bearing box. The front or outer end of the box is closed by a closure member 16 in the form of a circular journal box lid or cover removably secured to the box by cap screws 17.

Formed in the top wall or head portion 18 of the journal box, which wall terminates at its front in rear of the doorway 19 of the box and extends to a level above the top of the doorway, are pockets 20 and 21. These pockets are arranged adjacent to the front bearing cone 6 and preferably on opposite sides of the vertical center of the box and are closed at their inner or rear ends and open at their front ends through the forward surface of the wall 18 about in vertical alinement with the inner part of the doorway and above the level of the top of the doorway and its closure. These pockets are adapted to receive the signal cartridges 22 and 23 which are identical in construction with the exception of a certain feature, as hereinafter described.

Each cartridge comprises a preferably circular thin-walled shell 24 of heat-conducting metal and of uniform diameter from end to end. This shell is permanently closed at its inner or rear end by a wall 25 and is normally open at its outer, front or discharge end 26. To close the normally open end of the cartridge a diameter reducing means and a seating closure are provided. The diameter reducing means consists of a disk 27 of heat conducting metal the body portion of which is of uniform thickness except at its center, where it is provided with an inwardly extending boss 28 increasing its thickness. A threaded filling opening 29, of suitable general diameter, is formed at the center of the disk and extends from the outer face of the disk to and through the boss. The disk is set back within the front of the cartridge a certain distance from its end edge and is provided at its periphery with a forwardly extending seat flange 30 terminating in an outwardly and laterally extending bead 31 which overlaps the front end edge of the cartridge. The disk and its flange are adapted to be fitted with a tight frictional fit in the cartridge to a proper position accurately determined by the bead 31, which acts as a stop at the end of the fitting movement and also serves to give a smooth finish to the front end edge of the shell and to protect the same from contact with extraneous objects and possible injury thereby. The inner portion of the periphery of the disk is formed with an annular recess 32 to receive a ring 33 of securing material, such as silver solder. After the disk is fitted in position this solder ring is fused by heat applied to the adjacent external surface of the cartridge to permanently fasten the disk in place.

The cartridges are primarily charged through the openings 29 with suitable vaporizable materials for indicating by sense of sight or smell, or both, an overheated condition of the bearing, after which the openings 29 are closed by fusible closure means sealing the cartridges for use and application to the bearing pockets. As stated, two cartridges are preferably employed for use at a time on a bearing, one charged with a material to give a smoke signal and the other charged with a material to give an odor signal, in order to insure the giving of a readily detectable signal when the bearing becomes overheated. For example, cartridge 22 may be charged with a material which when vaporized will produce a dense smoke, while cartridge 23 may be charged with a material which when vaporized will produce a distinct and pervasive odor. However, two cartridges of either type, or a single cartridge of either type, may be used dependent upon the kind of bearing to be protected or other conditions. The flange 30, in addition to increasing the supporting stability of the disk, forms the boundary wall of a chamber 34 in front of the disk.

The fusible closure means for sealing the opening 29 is of special construction and embodies a plug 35 having an inner threaded shank portion 36 to fit within the opening and an outer head portion 37 for manipulating it. Preferably the threaded opening 29 and outer threaded surface of the shank 36 are slightly tapered for a wedging fit so that the plug when applied will securely close the opening. Formed in the plug portions 36 and 37 are inner and outer, axially alined discharge passages 38 and 39. The passage 38 is tapered from its inner end of major diameter, which opens directly through the inner face of the plug portion 36 and faces toward the interior of the tube and the charge of vaporizable material therein, to its restricted outer end, which communicates with the larger passage 39 leading to the outer atmosphere and said passage 38 is closed by a correspondingly shaped body of fusible material 40. The passage 39 is of greater diameter than the passage 38 to allow free discharge of the fusible material when fused under pressure of the generated signal vapor and the discharge of the latter at the outlet end of passage 38 in a controlled manner and for a determined period of time.

It will be noted that each cartridge is of a length somewhat less than the length of its receiving pocket in the bearing so that its discharge end directly faces the mouth or outlet end of the pocket but terminates just in rear thereof to leave sufficient space for the reception of an openwork retainer or retaining ring 41 which is sprung into a niche at the outlet end of the pocket and serves to hold the cartridge from outward displacement. This retainer may be applied and removed without the use of any special tool and permits free discharge of the fused fusible material and vapor therethrough when the cartridge is fired, and the ready removal of the spent cartridge and the insertion of a new one. It will also be noted that the head of the applied plug 36 is located inside of the plane of the bead 31 and within the chamber 34 whereby it is housed and protected from possible damage to it and through it to the seal. It will be further noted that the heads of the plugs 36 of the cartridges 22 and 23 are of different external forms, that of cartridge 22 being hexagonal and that of cartridge 23 being square, serving as indications of the character of the cartridges, i. e., that the first is a smoke cartridge and the second an odor cartridge. This is a simple way of distinguishing the cartridges from each other, but obviously other shapes of heads or other indicating means for the purpose may be used.

In preparing a cartridge for use the disk 27 is first applied and fastened in place, the cartridge then charged through the opening 29, and the opening 29 then sealed by the plug 36 whose passage 38 is filled with the fusible material 40. In the use of the device the charge begins to vaporize and the fusible material to melt as soon as the bearing is overheated, with the result that the melted fusible material is blown out of the passage 38 and through the opening 39, followed by the flow of the vapor to the atmosphere through these openings to give a warning signal indicating the condition of the bearing, so that measures may be taken to remedy the condition before the bearing is damaged The size of the opening 39 is such that it facilitates the discharge of the fusible material as soon as it is melted and expelled from the passage 38, leaving the way clear for outflow of the vapor, while the taper of the passage 38 and size of this passage at its outlet end is such that the outflow of the vapor is regulated, the passage serving as a meter orifice to spread the flow of vapor over a sufficient period of time to give an efficient signal, which usually requires from five to six minutes.

The above-described construction of the cartridge and its sealing means permits of the use of a comparatively wide-diameter, short-length cartridge, which is desirable for use on bearings of roller type and other bearings. It also admits of the manufacture of a cartridge which is simple and inexpensive, yet certain and reliable in action, and proof against leakage of the charge under certain service conditions. It often happens that a bearing will become heated to a high degree, below that requiring the giving of a warning signal, but sufficient to cause partial vaporization of the charge and softening of the fusible material so that with any ordinary type of seal pressure of the vapor is liable to cause partial or complete displacement of the softened fusible material followed by the leakage out of more or less of the generated vapor from time to time, eventually rendering the signal device inoperative or ineffective to give a proper signal indication when actual necessity for the giving of a signal occurs. My construction of seal avoids this objection, as under the same conditions the tapered body of softened but not melted fusible material will simply be packed more tightly in the tapered discharge passage, thus preserving the seal.

Having thus described my invention, I claim:

1. A signal device of the character described comprising a thin-walled cartridge tube of substantially uniform diameter from end to end for containing a charge of a vaporizable signalling material, said tube being permanently closed at one end and normally open at its opposite end, a diameter reducing disk fixed at its periphery within the latter named end of the tube and having a boss increasing its thickness at its center, the disk being formed with an inwardly tapering opening extending through its center and the boss, the wall of the opening being threaded, a plug having a corresponding tapered and threaded inner shank portion closing said opening and provided with an outwardly tapering vapor discharge passage and an outer wrench receiving head portion lying in advance of the disk and provided with an outlet passage of larger diameter than the reduced end of the tapering passage and communicating therewith, and fusible material normally closing the vapor discharge passage.

2. A signal device of the character described comprising a tube of substantially uniform diameter for containing a charge of a vaporizable signalling material, said tube having a closed end and a normally open end, a diameter reducing disk arranged in the tube adjacent to but spaced inwardly from the edge of the open end of the tube, said disk having a central opening and being peripherally secured to the inner periphery of the tube and provided with a flange extending outwardly therefrom coaxially with the tube and terminating in a bead bent outward laterally at an angle thereto and lapping over upon said end edge of the tube, and a plug including a shank portion closing said opening in the disk and a wrench receiving head portion disposed in the space bounded by said flange, said plug being provided with an outwardly tapering vapor discharge passage, and fusible means normally closing said vapor discharge passage.

3. A signal device of the character described comprising a tube of substantially uniform diameter for containing a charge of a vaporizable signalling material, said tube having a closed end and a normally open end, a diameter reducing disk arranged in the tube adjacent to but spaced inwardly from the edge of the open end of the tube, said disk having a central opening and being peripherally secured to the inner periphery of the tube and provided with a flange extending outwardly therefrom coaxially with the tube and terminating in a bead bent outer and laterally at an angle to the flange and lapping over upon said end edge of the tube, and a plug including a shank portion closing said opening in the disk and provided with an outwardly tapering vapor discharge passage and a wrench receiving head portion disposed in the space bounded by the flange and having an opening of larger diameter than said passage and intersecting the reduced end thereof, and fusible means normally closing said vapor discharge passage.

4. A signal device of the character described comprising a tube of substantially uniform diameter for containing a charge of a vaporizable signalling material having a closed end and a normally open end, a comparatively thin diameter reducing disk arranged in the tube adjacent to but spaced inwardly from the edge of the open end of the tube, said disk having a central thickening boss and an opening extending through its body portion and boss and being peripherally secured to the inner periphery of the tube and provided with a flange extending outwardly therefrom coaxially with the tube and terminating in a bead bent laterally at an angle to the flange and lapping over upon said end edge of the tube, and a plug including a shank portion closing said opening in the disk and provided with an outwardly tapering vapor discharge passage and a wrench receiving head portion disposed in the space bounded by the flange and having an opening of larger diameter than said passage and intersecting the reduced end thereof, and fusible means normally closing said vapor discharge passage.

5. A signal device of the character described comprising a cartridge tube for containing a charge of a vaporizable signal material, said tube having a normally open discharge end, and a sealing closure for said end of the tube comprising a diaphragm-like disk member arranged adjacent to but set inwardly from the edge of the normally open end of the tube and peripherally secured to the interior of the tube and partitioning the tube into an inner charge receiving chamber and an outer chamber between the same and said edge of the tube, said member having a threaded opening therein through which the cartridge is adapted to be charged, and a closure plug for said opening having a threaded shank portion engaging said threaded opening, a wrench receiving head portion lying within said outer chamber and a vapor discharge passage extending through said shank and head portions and communicating at its inner end with the interior of the tube and at its outer end with the atmosphere, and a body of fusible material closing said passage.

6. A signal device of the character described comprising a thin-walled cartridge tube of substantially uniform diameter from end to end and having a charge receiving chamber, said tube being permanently closed at one end and normally open at its opposite end, a diameter reducing diphragm-like disk arranged within the tube adjacent its open end but set inwardly a distance from the edge of said end and fixed at its periphery to the inner surface of the tube, said disk being formed with a central opening through which the tube may be charged with a vaporizable signal material and being provided at its periphery with a flange extending toward the end edge of the open end of the tube and forming a reinforcing lining for that portion of the tube projecting outwardly beyond the disk and cooperating therewith to form an outer chamber separated by the disk from the charge receiving chamber and lying between the disk and end edge of the open end of the tube, a plug having a shank portion threaded in and closing the central opening in the disk, a head portion lying within said outer chamber and a vapor discharge passage extending through said shank and head portions and communicating at its inner end with the interior of the tube and at its outer end with the atmosphere, and a body of fusible material closing the vapor discharge passage.

7. A signal device of the character described comprising a thin-walled cartridge tube of substantially uniform diameter from end to end and having a charge receiving chamber, said tube being permanently closed at one end and normally open at its opposite end, a diameter reducing diphragm-like disk arranged within the tube adjacent its open end but set inwardly a distance from the edge of said end and fixed at its periphery to the inner surface of the tube, said disk being formed with a central opening through which the tube may be charged with a vaporizable signal material and being provided at its periphery with a flange extending toward the end edge of the open end of the tube and forming a reinforcing lining for the end of the tube projecting outwardly beyond the disk and cooperating with said projecting end of the tube to form an outer chamber separated by the disk from the charge receiving chamber and lying between the disk and end edge of the open end of the tube, said flange being provided at its free edge with a laterally bent bead abutting against said end edge of the tube, a plug having a shank portion threaded in and closing the central opening in the disk, a head portion lying within said outer chamber and a vapor discharge passage extending through said shank and head portions and communicating at its inner end with the interior of the tube and at its outer end with the atmosphere, and fusible material closing the passage.

HERBERT W. FAUS.

REFERENCES CITED

The following references are of record in the file of this patent:

UNITED STATES PATENTS

| Number | Name | Date |
|---|---|---|
| 893,028 | Smith | July 14, 1908 |
| 1,237,957 | Ray et al. | Aug. 21, 1917 |
| 1,544,098 | Mauran | June 30, 1925 |
| 1,573,488 | Hackman | Feb. 16, 1926 |
| 1,575,306 | Ahldin | Mar. 2, 1926 |
| 2,035,855 | Wood | Mar. 31, 1936 |
| 2,280,755 | Hexamer | Apr. 21, 1942 |

OTHER REFERENCES

Railway Mechanical Engineer, April 1946, "Smoke-and Odor" Hot Box Alarm, pages 186, 187, 188, and 193.